Jan. 28, 1958  L. G. RANFT ET AL  2,821,106
MULTIPLE IMAGE HIGH SPEED MOTION PICTURE CAMERA
Filed July 20, 1955  5 Sheets-Sheet 1

INVENTORS
Ludwig G. Ranft
BY Robert B. Herden
Charles Shepard
Attorney

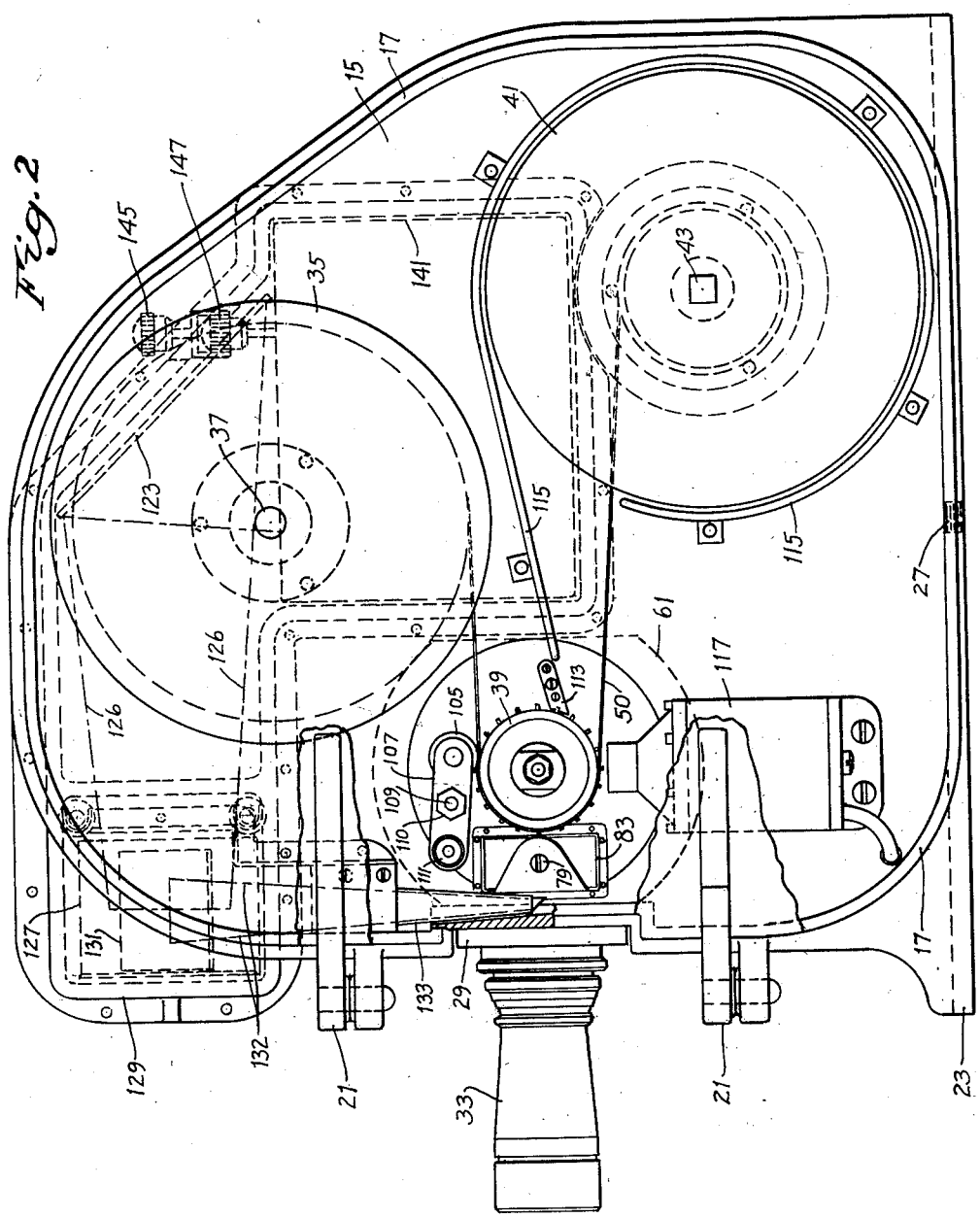

Jan. 28, 1958     L. G. RANFT ET AL     2,821,106
MULTIPLE-IMAGE HIGH SPEED MOTION PICTURE CAMERA
Filed July 20, 1955     5 Sheets-Sheet 3
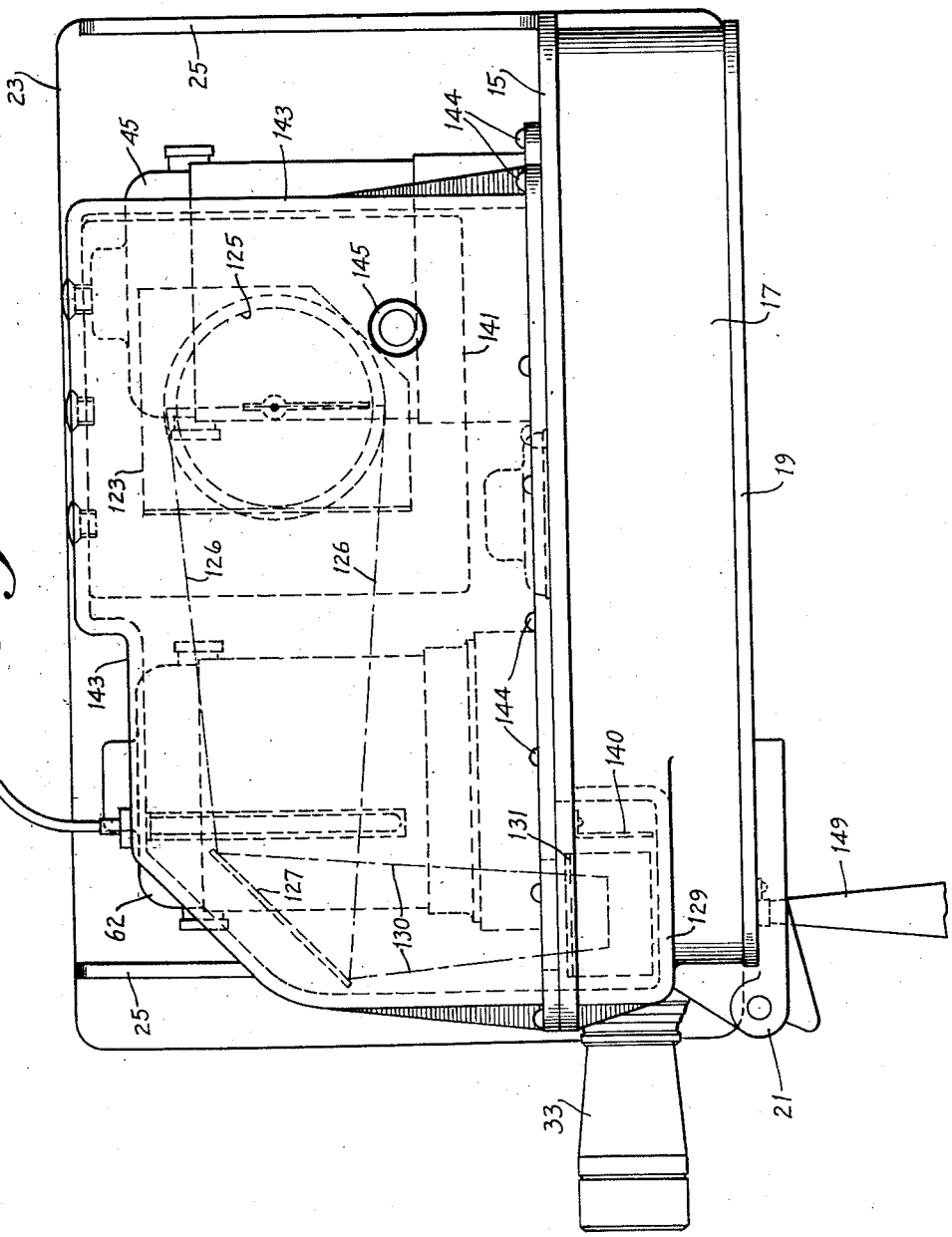
INVENTORS
Ludwig G. Ranft
BY Robert B. Herden
Charles Shepard
Attorney

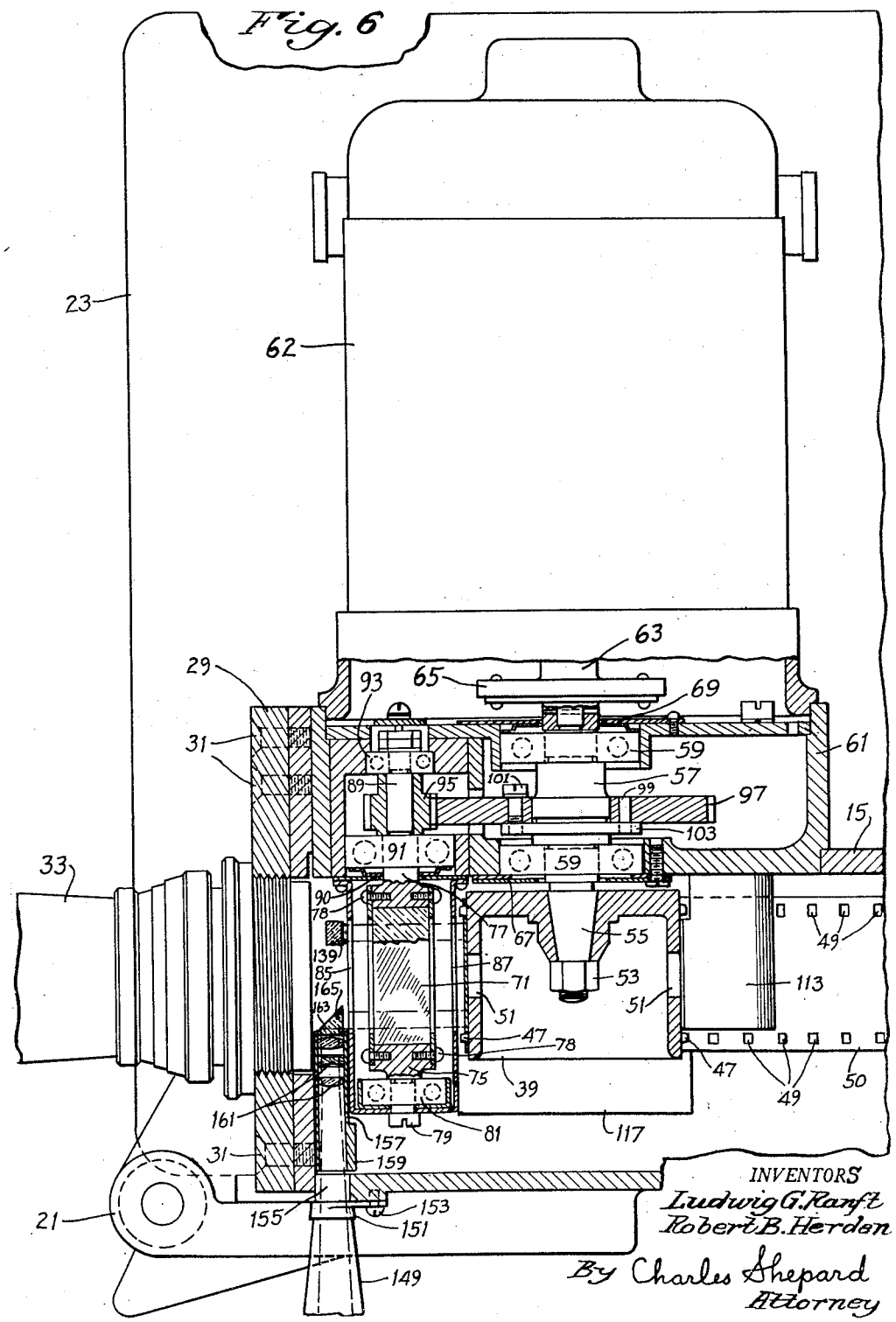

Jan. 28, 1958 L. G. RANFT ET AL 2,821,106
MULTIPLE IMAGE HIGH SPEED MOTION PICTURE CAMERA
Filed July 20, 1955 5 Sheets-Sheet 5
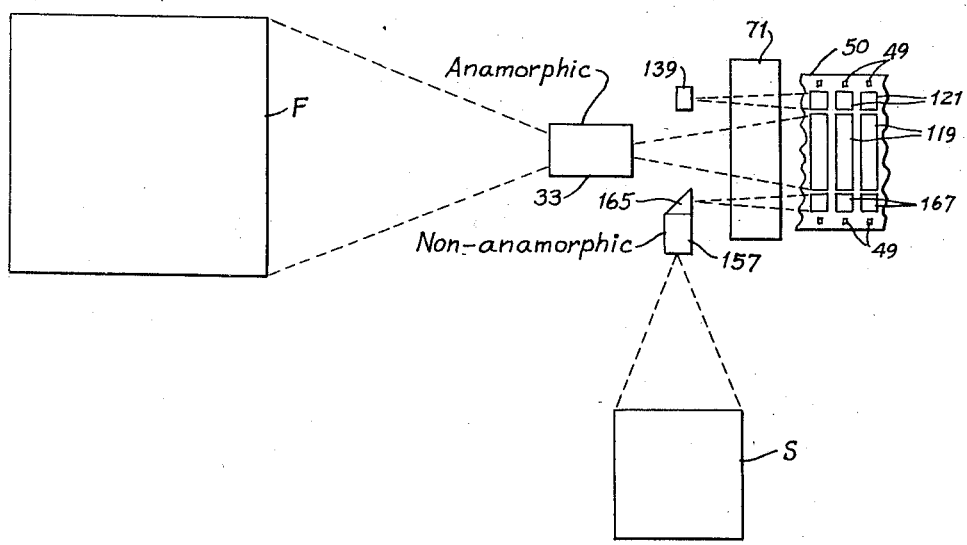
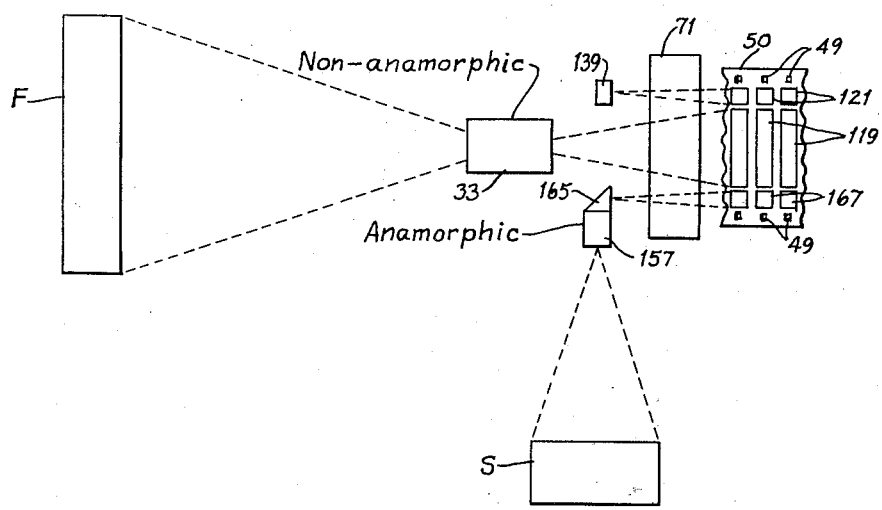
INVENTORS
Ludwig G. Ranft
BY Robert B. Herden
Charles Shepard
Attorney

United States Patent Office 2,821,106
Patented Jan. 28, 1958

2,821,106

MULTIPLE IMAGE HIGH SPEED MOTION PICTURE CAMERA

Ludwig G. Ranft, Irondequoit, and Robert B. Herden, Webster, N. Y., assignors to Wollensak Optical Company, Rochester, N. Y., a corporation of New York Application July 20, 1955, Serial No. 523,171

8 Claims. (Cl. 88—16)

The invention relates to multiple image high speed motion picture cameras.

An object of the invention is to provide a new or generally improved and more satisfactory high speed motion picture camera adapted to make simultaneous exposures of different subjects.

Another object is to provide a high speed motion picture camera with an auxiliary optical system for projecting a clock face image or a counter or any other desired auxiliary scene or view onto a film strip simultaneously with the image projected by the camera main objective.

Still another object is to provide a high speed motion camera with an auxiliary optical system for making exposures of subjects located laterally of the camera main optical axis.

A further object is the provision of simple and inexpensive auxiliary optical systems on a high speed motion camera to form images of multiple scenes or fields on the film.

A still further object is the provision of a multiple image high speed motion picture camera which is simple in construction and operation.

These and other desirable objects may be attained in the manner disclosed as an illustrative embodiment of the invention in the following description and in the accompanying drawings forming a part hereof, in which:

Fig. 2 is a right side elevation of the structure shown in Fig. 1, with the access door of the camera housing removed to illustrate a portion of the interior construction;

Fig. 5 is a top plan of the structure shown in Fig. 1;

Fig. 6 is a partial horizontal section, on an enlarged scale, of a portion of the structure shown in Fig. 5;

Fig. 7 is a diagrammatic view of a modified form of the present invention; and

Fig. 8 is a similar view of another modification.

The same reference numerals throughout the several views indicate the same parts.

In various engineering and other scientific fields, rapidly moving subjects have been photographically recorded for purposes of study and analysis by the use of high speed motion picture cameras in which continuous film movement is utilized by displacing the images synchronously with the film by means of a rotating prism, the housing of which serves as a shutter. Normally, these known high speed motion picture cameras provide the film with only a single image, making it difficult to determine the speed of the various movements of the recorded subject or to correlate the movements of the recorded subject with a different but related subject. In accordance with the present invention, the known high speed motion picture cameras have been improved by providing auxiliary optical systems which permit, for example, the image of a clock face, or the dials of any other recording equipment, and a related subject, to be projected on the film strip simultaneously with the image of the main subject.

Figure 1:
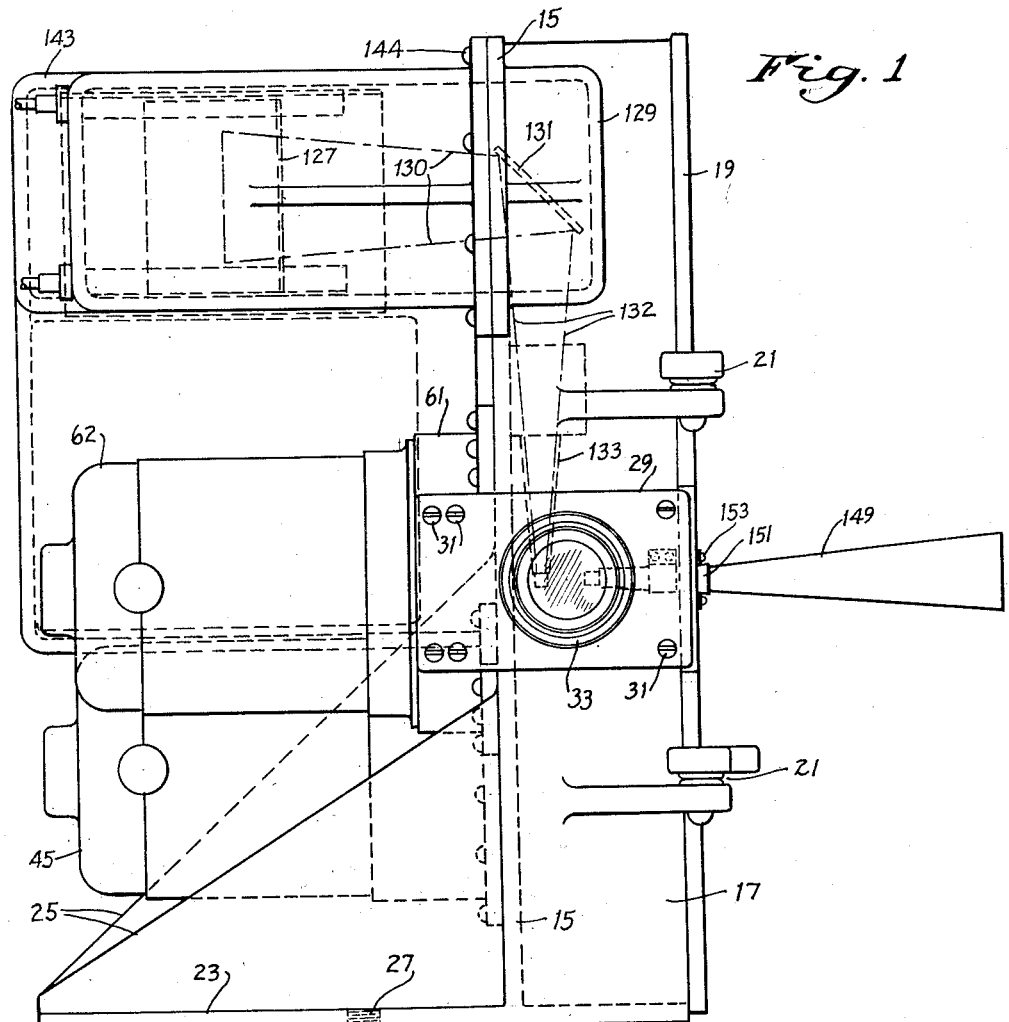
Fig. 1 is a front elevation or face view of the photographic camera of the present invention.

The high speed motion picture camera of the present invention, except for the new construction of the auxiliary optical systems, as hereinafter disclosed, and the construction of certain associated parts, may be of any known construction, as for example the familiar camera commercially available on the market under the trademark "Fastax," manufactured by Wollensak Optical Company of Rochester, New York. In the preferred form, the high speed motion picture camera of the present invention includes a housing or casing having a vertical side wall 15, a peripheral enclosing wall 17 integral with the side wall 15, and an access door assembly 19 pivotally mounted on the peripheral wall 17 by the hinge members 21 and adapted to be latched in closed position. The camera housing is fixed, at its lower end, to a laterally extending horizontal support or base plate 23, suitably reinforced by flanges 25 and provided with a threaded aperture 27 for attachment to a conventional tripod or other support structure. As seen in Figs. 1 and 2, a lens plate 29 is fixed, as by screws 31, to the front of the camera housing and supports the main objective lens in the tubular mount 33 with its axis disposed in a horizontal plane. The peripheral wall 17 is provided with an opening adjacent to the lens mount 33 to permit light rays to enter into the camera housing and expose the continuously moving film in a sequence as determined by the rotating prism.

Figure 3:
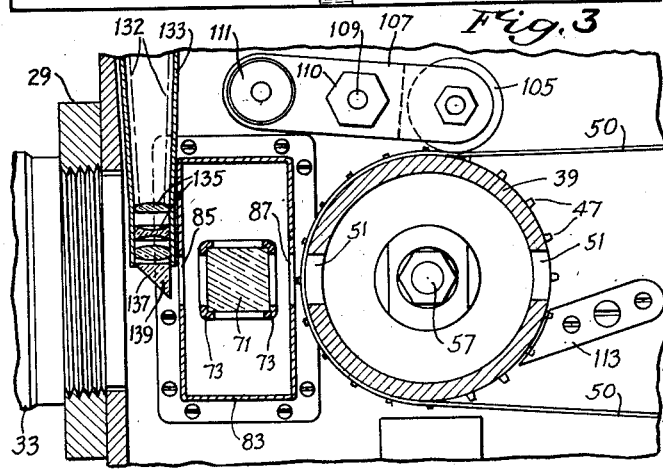
Fig. 3 is a vertical section, on an enlarged scale, of a portion of the structure shown in Fig. 2.

The operating mechanism of the camera includes a number of components of sub-assemblies such as the film supply or feed assembly which includes a supply spool or reel 35 rotatably mounted on an idler or feed spindle 37 extending from the housing side wall 15, a drive assembly having as its main element a sprocket wheel 39, and a take-up assembly including a take-up spool or reel 41 mounted on the square take-up spindle 43 for rotatable movement by the electric motor 45 disposed outwardly of the camera housing. The drive mechanism sprocket wheel 39, as seen in Figs. 2 and 3, is disposed with its axis horizontal and intersecting at right angles the horizontal optical axis of the main objective, and is provided on its exterior surface with a plurality of circumferentially disposed teeth or cogs 47, which are adapted to engage within the longitudinally extending rows of perforations 49 found on the conventional motion picture film 50, which is drawn from the supply reel 35, passes partly around the sprocket, and thence goes to the take-up or rewinding reel 41. The sprocket also has a pair of viewing holes 51 which are arranged diametrically opposite each other and are employed for focusing purposes.

As seen in Fig. 6, the sprocket wheel 39 is wedged, by locknut 53, onto the tapered end 55 of the stub shaft 57 suitably supported by the pair of ball bearings 59 carried by the gear housing 61 which is seated within an opening in the housing side wall 15. To maintain the acceleration and high running speed characteristics of the camera, the sprocket shaft 57 is driven by a second electric motor 62 which has its drive shaft 63 coupled to the sprocket shaft 57 by a coupling 65. Suitable cover plates, baffles, and gaskets, shown as for example at 67 and 69, may be provided for preventing the entrance of oils or other foreign matter from the gear chamber into the optical chamber or into the motor, respectively.

The image transfer to the moving film is effected by a multi-sided optical glass prism 71 which is rotatable about an axis parallel to the axis of the sprocket wheel 39. The camera shutter effect is provided by the prism mount which consists of a skeleton or open-sided tube 73 secured to the axially spaced trunnions 75 and 77 as by screws 78. The trunnion 75 terminates with a slotted head 79 for adjustment purposes, and is supported within the ball bearing 81 carried by the approximately rectangular prism housing 83, which is stationary and is suitably apertured along the optical axis of the camera at 85 and 87, while the trunnion 77 is provided with an elongated shaft portion 89 mounted within the ball bearings 91 and 93 carried by the gear housing 61.

Rotation of the prism 71 in synchronism with the sprocket wheel 39 is accomplished by the spur gear 95, keyed or otherwise fixed to the shaft 89 and meshing with the driving spur gear 97, which is connected, by the pin 99 and screw 101, to the disk 103 fixed to the stub shaft 57. A gasket and cover plate, such as 90, may surround the trunnion 77 to prevent oil or vapor from the gear chamber reaching the optical chamber.

With this arrangement, the image formed by the main objective lens at the film plane is moved in synchronism with the film and the sprocket wheel by the rotating prism 71, thereby producing a continuous exposure on the central portion of the film within the limits of the opening 87 in the prism housing 83. Furthermore, by employing separate drive and take-up motors, high speed operating characteristics are maintained, thereby enabling the film to be moved with great rapidity past the framing opening 87.

In view of the high speed operation of the camera, additional features are incorporated into the structure to insure proper movement of the film and to protect both the camera and the film from damage, especially as the tail end of the film leaves the supply spool 35. A hold down roller 105 is disposed over the sprocket wheel 39 in position to contact the film as it leaves the supply spool 35 and insure proper engagement between the sprocket wheel cogs 47 and the film perforations 49. The hold down roller 105 is carried by the lever 107 which is mounted within the camera housing on an eccentric shaft 109 by the lock nut 110, and has on its opposite end a latch mechanism 111 which, when released, permits the lever 107 and hold down roller 105 to move counter-clockwise, out of operative position shown in Fig. 3, for film loading operations. In addition, the camera housing supports a film stripper 113 adapted to separate the film from the sprocket wheel 39, and a film guard 115, partially encircling the take-up spool 41 and secured to the inside face of the housing side wall 15, as shown in Fig. 2, or alternatively on the inside surface of the door assembly 19.

To record the speed of the film, timing marks are provided along one edge of the developed film outside the picture area by a timing device 117 (see Fig. 2) which includes a neon glow lamp enclosed with a housing and energized by alternating current surges to provide a flashing light which is focused on the edge of the film by a small lens positioned at the top of the timing device. The details of the timing device have little bearing on the improvement of the present invention and therefore any known timing device may be employed.

Figure 4:
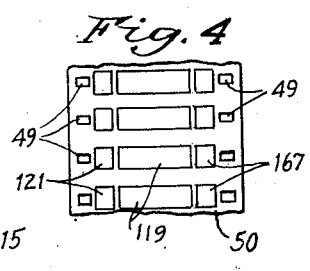
Fig. 4 is a fragmentary portion of an exposed film strip.

The main image of the main event being recorded, such as the image 119 shown on the film strip in Fig. 4, is formed by the light rays passing through the main objective 33 and the rotating prism 71 to expose the film, as successive portions thereof are drawn by the sprocket wheel 39 into positions opposite the opening 87 in the prism housing. In accordance with the present invention, auxiliary optical systems are provided to permit additional images of instruments registering related parameters to be recorded simultaneously with the main image to assist in more rapidly and accurately evaluating the operating characteristics of the subject recorded by the main image, as well as selected portions of the instrumentation set-up or any instrumentation parameters represented by dial positions, etc. As best seen in Figs. 1, 2, and 5, one of these auxiliary optical systems (shown in broken lines on the drawings), is designed to project an image of the face of any desired measuring instrument, such as a counter or a suitably illuminated clock (preferably a chronoscope) onto the film, to one side of the main image, as shown for example at 121 in Fig. 4. This optical system includes a first reflector 123 inclined at approximately 45° to the plane of the clock face 125 to reflect an image of the clock face forwardly along the path indicated diagrammatically by the boundary lines 126 onto an upright reflector 127 which is oriented to project the clock face image laterally toward the camera housing.

The topmost front portion of the camera housing is bulged outwardly to form a compartment 129 (see Figs. 1, 2, and 5) within which is disposed a reflector 131 inclined toward the upright reflector 127 at approximately 45° to a horizontal plane. The reflected image projected by the reflector 127 passes along the path indicated diagrammatically at 130, through a suitable opening in the side wall 15 of the camera housing and onto the reflector 131, from which it is reflected downwardly along the path 132 into the camera housing through the lens tube 133 to the auxiliary lens system 135 (see Fig. 3). After passing through the lens system 135 the light rays from the clock face are reflected at right angles by the surface 137 of the prism 139, and emerge along a horizontal plane passing through the optical axis and offset laterally from the optical axis, so that the image of the clock face, after passing through the rotating prism 71, falls on only a small area 121 near one edge of the film strip, as seen in Fig. 4. The lens system 135 focuses and images the clock face on the film strip, subject of course to the action of the rotating prism 71.

To prevent any of the light rays received by the reflector 131 from passing to the unexposed film on the supply spool 35, the compartment 129 is provided with a suitable light stop 140, as shown by broken lines in Fig. 5.

As best seen in Figs. 2 and 5, the reflectors 123 and 127 and the clock mechanism 141 are housed within a separate casing 143 secured to the wall 15, above the electric motors 45 and 62, as by bolts 144. Access to the clock mechanism for dial setting and winding is accomplished by the knob 145 which extends outwardly through the top of the casing 143 and is operatively connected to the knob 147 of the clock mechanism.

When employing the above described auxiliary optical system, it is seen that exposed film strip provides the user with a permanent and accurate record of the main subject photographed and also with a record of a suitable measuring instrument or other reference data, such as a chronoscope from which the speed or time interval required for the main subject to pass through certain movements or paths may be easily determined. To simplify still further the evaluating procedure and to provide the user with supplementary data having a bearing on the main subject being studied, a second auxiliary optical system is also provided for projecting onto the film strip an image of a subject, such as a related moving part or oscilloscopic trace or a stationary set-up or an identifying chart or recording dial or other desired data, which is located laterally of the optical axis or which is directed into the lateral optical system of the camera and onto the secondary image space of the film by any suitable mirrors or other reflecting or refracting elements.

As best seen in Figs. 1 and 6, the lateral or second auxiliary optical system includes a first or entrance tube 149, having the shape of a truncated cone or pyramid and being carried outwardly of the camera housing by the bracket 151 secured, as by screws 153, to the door assembly 19. Adjacent the reduced end of the tube 149, the door assembly is provided with an opening 155 through which light rays are free to pass into a second or lens tube 157 supported by the bracket 159 (see Fig. 6) with its axis alined with that of the tube 149 and at approximately right angles to the main optical axis of the camera. Within the inner end of the second or lens tube 157 is positioned an auxiliary lens system 161 which projects the image onto the reflecting surface 163 of the prism 165, from which the image is reflected at right angles to its original path. By means of the prism member 165, the image is projected through the rotating prism 71 in a plane parallel to but laterally spaced from the main optical axis of the camera (see Fig. 6) to expose a small portion of the film laterally of the image formed by the main objective, as shown for example at 167 in Fig. 4. The image areas 121 and 167 may both be referred to as the secondary image areas or spaces on the film, as distinguished from the main or primary image areas or spaces 119.

As in the case of the first auxiliary or secondary optical system, the light rays entering through the second auxiliary or secondary system are focused and imaged by the lens system 161 onto the film, subject to the action of the rotating prism 71. The light from any desired subject or event to be photographed by this second auxiliary system is fed or directed onto the entrance tube 149 by any suitable system of mirrors or reflectors, usually set up temporarily on adjustable standards or supports to meet the spatial and other requirements of the particular job.

In many instances, the scenes to be viewed by the lateral or second auxiliary optical system and recorded in the secondary image areas or spaces 167 will be scenes of relatively small extent, such as an instrument dial no larger or not much larger than the dial 125 recorded in the secondary image areas or spaces 121. In such cases, the image can be adequately projected onto the film by ordinary optical systems of the kind giving equal magnification to all directions perpendicular to the optical axis. In other instances, however, it may be desired to use the secondary image areas 167 for recording scenes in which one dimension is materially greater than another, or scenes in which one dimension is of greater factual or analytical importance than another and which should be projected with greater magnification in this important dimension than in the other dimension. In such instances, it is a feature of the present invention to utilize an anamorphic optical system in projecting the image onto the film. It is also a feature of the present invention to use an anamorphic optical system in projecting the image of the main or principal scene onto the main or principal image areas 119, whenever difference in magnification in two dimensions is important, e. g., when compressing a substantially square field of view onto an elongated rectangular image area such as provided at 119.

Various anamorphic optical systems are already well known in the art, employing anamorphic lenses, mirrors, prisms, or combinations thereof. For purposes of the present invention, the exact details of the anamorphic system are not important, and any suitable anamorphic system of known form may be employed, either as a substitute for or as an auxiliary to the main or principal optical projection system or objective system in the mount 33, or the secondary projection system or objective system 161, 163.

Although anamorphic optical systems themselves are known and the details are not new, it is nevertheless believed to be a novel and inventive concept to employ, in combination, both an ordinary optical system and an anamorphic optical system for simultaneously projecting images onto the same strip of motion picture film, e. g., when an anamorphic system is used for or in conjunction with one but not both of the objectives 33 and 161, 163. It is also believed to be a novel and inventive concept to employ an anamorphic optical system in combination with a high speed motion picture camera of the type in which the image is projected through a rotating prism. In such a camera, the prism necessitates a rather severe limitation of the size of each image frame in the direction of movement of the film, but allows the full width or any desired part of the width of the film to be utilized. Therefore, if the scene or view to be photographed is approximately square, the square field must be distorted to a rectangular image elongated in a direction across the film and compressed or reduced in the direction of travel of the film, if full advantage is to be taken of the width possibilities of the film while at the same time staying within the length (film travel direction) limitations imposed by the rotating prism. Thus the present invention, by employing an anamorphic system within or in conjunction with the lens mount 33 so as to compress the image in the direction of film travel to a greater extent than across the direction of film travel, serves to make a camera of this type more efficient and practical than would otherwise be the case.

The employment of an anamorphic system for the primary objective 33 but not for the secondary objective 161, 163 is illustrated diagrammatically in Fig. 7, where the primary field viewed by the objective 33 is indicated at F, and the secondary field viewed by the auxiliary objective 161, 163 is indicated at S, the respective images being designated by the same numerals 119 and 167 as used in Fig. 4. In Fig. 8 is shown diagrammatically the use of an anamorphic secondary objective 161, 163, the primary objective 33 being non-anamorphic. Preferably an anamorphic lens mount and a regular or non-anamorphic lens mount are provided, interchangeable with each other, for each of the mounts 33 and 157, so that either may be used as desired, depending on the requirements of the particular analysis job to be performed by the camera. As already indicated, the anamorphic elements may be mounted separately and used as auxiliaries to the mounts 33 and 157, instead of being mounted physically within them.

From the above description it is seen that the rotating prism housing functions as a shutter for both the main objective and the auxiliary or secondary optical systems, thereby simultaneously producing continuous exposure on three laterally alined portions of the film, as seen in Fig. 4, without impairing the quality or the magnification of the primary image formed by the main objective. The advantages of recording multiple images as above described are readily apparent, especially when the camera is employed in scientific studies. Furthermore, the improvement of the present invention has not modified the original function of known high speed cameras and it will be understood that the camera disclosed herein may be employed in the same manner as known high speed cameras by merely closing the lens tubes 133 and 157 by any suitable light stop means.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A multiple image high speed motion picture camera comprising a relatively narrow upright casing, a film supply reel and a film take-up reel and a film sprocket within said casing, a main objective mounted on a front wall of said casing to project light along a main optical axis toward said sprocket, driving means projecting laterally from one side of said casing, said driving means being operatively connected to said sprocket and said take-up reel to cause advance of film from said supply reel to said sprocket and thence to said take-up reel, a timing device mounted on said casing, said timing device having a timing dial located laterally of said main optical axis and rearwardly of said sprocket, a first reflector for reflecting light from said dial forwardly along a first path above and laterally offset from and approximately parallel to said main optical axis, a second reflector for reflecting light from said first path laterally along a second path above and transverse to said main optical axis to a position within said casing, a third reflector for reflecting light from said second path approximately vertically downwardly along a third path in a general direction toward but offset slightly laterally from said main optical axis in a position in advance of said sprocket, a fourth reflector for reflecting light from said third path rearwardly along a fourth path substantially parallel to and offset laterally from said main optical axis in position to fall on film on said sprocket, and an auxiliary objective interposed in said third path for focusing an image of said timing dial substantially on film located on said sprocket in a location near one edge of the film and laterally offset from the main image projected by said main objective.

2. A construction as defined in claim 1, further including a light transmitting tube projecting laterally from said casing and adapted to receive light rays from a scene different from but related to the scene projected by said main objective, said transmitting tube having an approximately horizontal axis substantially intersecting said main axis in a position in advance of said sprocket, a fifth reflector for reflecting light from said tube axis rearwardly along a fifth path substantially parallel to said main optical axis and offset laterally on the opposite side of said main optical axis from said fourth path, in position to fall on film on said sprocket, and a second auxiliary objective substantially alined with said tube axis adjacent said fifth reflector for focusing light passing through said tube to form an image on film located on said sprocket near the opposite edge of the film from the image formed by the first auxiliary objective.

3. A construction as defined in claim 2, further including means mounted within said casing beneath said sprocket for projecting a series of light impulses upwardly to film on the lower part of the sprocket, to form a series of timing marks on the traveling film.

4. A motion picture camera comprising in combination, means for advancing continuously an elongated strip of film, a prism rotating in synchronism with the advancing motion of the film, a primary optical objective system for projecting an image of a first scene through said prism and onto the moving film, and a secondary optical objective system for projecting an image of a second scene through the same prism and onto the same film simultaneously with the projection of the first image, one of said two optical objective systems being anamorphic and serving to compress one of said images in the direction of film travel to a greater degree than the compression thereof in a direction across the film.

5. In a motion picture apparatus, the combination with means for advancing a strip of film continuously, of an optical prism mounted for continuous rotation about an axis spaced from the advancing film and extending substantially parallel to the width of the film and capable, during rotation, of passing an optical image having a cross sectional dimension relatively great in the direction of width of the film and relatively small in the direction of advancing movement of the film, a primary optical objective system operatively positioned to project an image of a main scene through said prism onto said film to occupy a major part of the width of the film strip, a time measuring instrument, a first auxiliary optical objective system operatively positioned to project an image of a portion of said time measuring instrument through the same prism onto the same strip of film to occupy a minor part of the width of the film strip near one edge thereof, and a second auxiliary optical objective system operatively positioned to project an image of a supplemental scene external of the camera and offset from the main scene, through the same prism onto the same strip of film to occupy a minor part of the width of the film strip near the opposite edge thereof.

6. A construction as defined in claim 5, in which one of said optical objective systems is anamorphic.

7. A construction as defined in claim 6, in which the anamorphic objective system is the primary objective system and is oriented to reduce the size of the image projected by it to a greater degree of compression in the direction of travel of the film strip than in a direction across the width of the film strip.

8. A construction as defined in claim 6, in which the anamorphic objective system is the second auxiliary objective system and is oriented to reduce the size of the image projected by it to a greater degree of compression in the direction of travel of the film strip than in a direction across the width of the film strip.

References Cited in the file of this patent

UNITED STATES PATENTS

| | | |
|---|---|---|
| 1,829,634 | Chretien | Oct. 27, 1931 |
| 1,910,995 | Leventhal | May 23, 1933 |
| 2,045,414 | Rumpel | June 23, 1936 |
| 2,111,516 | Roux | Mar. 15, 1938 |
| 2,160,006 | Thompson et al. | May 30, 1939 |
| 2,257,100 | Belock | Sept. 30, 1941 |

FOREIGN PATENTS

| | | |
|---|---|---|
| 673,007 | Great Britain | May 28, 1952 |